United States Patent [19]

Grawey

[11] 4,337,814
[45] Jul. 6, 1982

[54] AIR VALVE CONDUIT IN THE TRACK WALL OF A TIRE

[75] Inventor: Charles E. Grawey, Peoria, Ill.

[73] Assignee: Caterpillar Tractor Co., Peoria, Ill.

[21] Appl. No.: 261,114

[22] PCT Filed: Sep. 22, 1980

[86] PCT No.: PCT/US80/01272
§ 371 Date: Sep. 22, 1980
§ 102(e) Date: Sep. 22, 1980

[87] PCT Pub. No.: WO82/00978
PCT Pub. Date: Apr. 1, 1982

[51] Int. Cl.³ ............................................. B60C 29/00
[52] U.S. Cl. ................................. 152/429; D12/153;
137/232; 138/89.1; 138/89.3; 138/89.4;
138/116; 152/185.1; 152/354 R; 152/355;
152/359; 156/120
[58] Field of Search ............... 152/427, 428, 429, 331,
152/330 R, 185.1, 354 R, 355, 356 R, 358, 359,
361 R, 361 DM, 415, 176; 156/110 R, 120, 123
R, 513, 514; 137/232; 285/200; 138/89.1, 89.2,
89.3, 89.4, 116; D12/152, 153

[56] References Cited

U.S. PATENT DOCUMENTS

| D. 226,657 | 4/1973 | Grawey et al. ...................... D12/209 |
| 1,067,668 | 7/1913 | McCleary .......................... 152/429 X |
| 2,052,130 | 8/1936 | Cassady ........................... 152/429 X |
| 2,746,812 | 5/1956 | Eger ................................ 152/429 X |
| 3,311,153 | 3/1967 | Wolfe ................................ 152/429 |
| 3,470,933 | 10/1969 | Molnar ............................ 152/429 X |
| 3,606,921 | 9/1971 | Grawey ........................... 152/429 X |
| 3,899,220 | 8/1975 | Grawey et al. .................... 152/185.1 |
| 4,238,258 | 12/1980 | Kraps et al. ......................... 156/120 |

Primary Examiner—John E. Kittle
Assistant Examiner—Thomas Bokan
Attorney, Agent, or Firm—Phillips, Moore, Weissenberger, Lempio & Majestic

[57] ABSTRACT

Tires are typically inflated through an air conduit mounted on the tire carcass and extending through a hole in the metal rim on which the tire is mounted. Now and then relative slipping between the tire and rim has caused the air conduit to be sheared off, deflating the tire. The present invention overcomes this problem by moving the air conduit (26, 33, 37) completely away from the rim. The air conduit (26, 33, 37) extends from the air chamber (12) through the track wall (10) to the side wall (8) of the carcass (7) and terminates in an air valve receptacle (27) accessible at the side wall (8) of the carcass (7).

5 Claims, 3 Drawing Figures

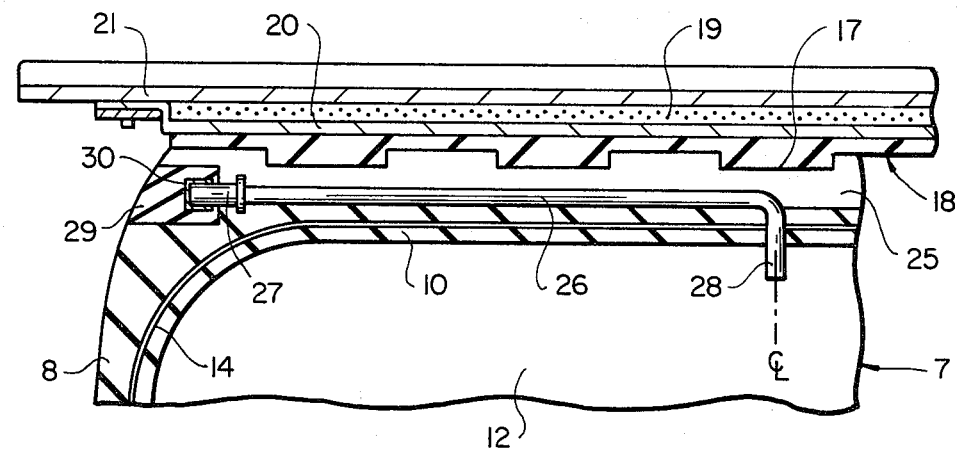
FIG_1
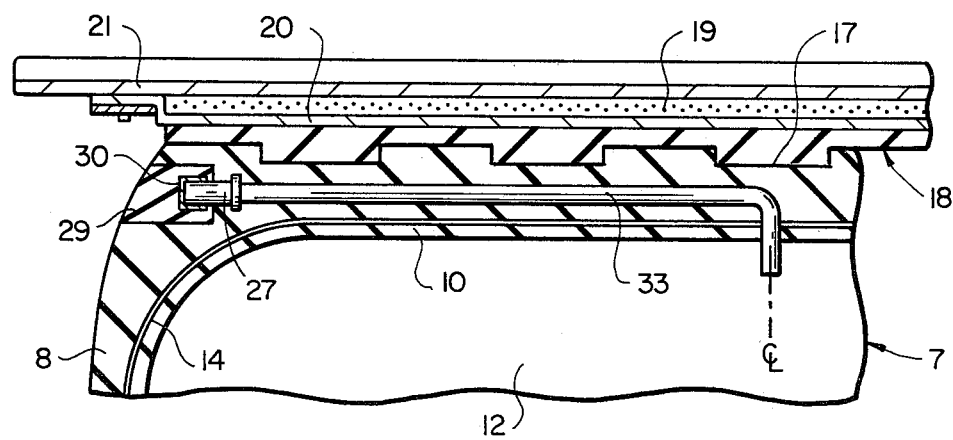
FIG_2
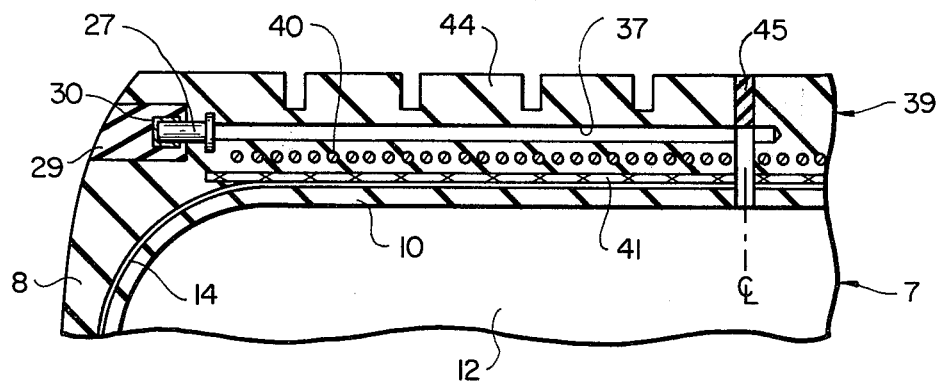
FIG_3

AIR VALVE CONDUIT IN THE TRACK WALL OF A TIRE

DESCRIPTION

1. Technical Field

This invention relates generally to tires and more particularly to tire filling arrangements.

2. Background Art

In some closed torus tires the air filler device, a valve stem, is integrally formed in the rim wall of the tire. The valve stem protrudes through a hole provided in the rim, and is accessible for tire filling and pressure regulation. A tire of this type is disclosed in U.S. Pat. No. 3,606,921, Sept. 21, 1971 to C. E. Grawey entitled, "Belted Oval Pneumatic Tube Tire". Such a tire is commonly mounted on a two piece rim.

Occasionally, rim to tire slippage occurs between the rim and tire due to the high drive train torque applied to the tire. Rim movement with respect to the tire can shear-off or badly damage the valve stem. Thus, the tire goes flat, or becomes unoperable.

Also, a valve stem located in the rim is subject to a continuing problem of mud, rock, foreign material to the extent that the valve stem can become damaged or inaccessible due to foreign material buildup around the stem.

In an other closed torus tire application a flexible track belt can be circumferentially placed about the tire; such a belt is disclosed in U.S. Pat. No. 3,899,220, Aug. 12, 1975, to C. E. Grawey, et al, entitled, "Flexible Sealed Track Belt". As the coefficient of friction between the track belt and tire is negligible, the problem of slippage between tire and rim is increased; thereby the likelihood of valve stem damage is likewise increased.

The present invention is directed to overcoming one or more of the problems as set forth above.

DISCLOSURE OF THE INVENTION

In one aspect of the present invention a tire carcass is fitted with an air conduit which communicates in the track wall with the air chamber and which is connected in the side wall of the tire carcass to an air valve receptacle.

In another aspect of the present invention, an air conduit is installed by forming a slot in the outer surface of the tire carcass and forming a passage through the track wall into the air chamber. An air conduit is positioned in the slot and the passage so that the conduit communicates with the air chamber and is accessible at the side wall of the tire.

The present invention is directed to the prevention of damage to air conduits by relative motion between tire carcasses and rims. The present invention solves this problem by moving the air conduit completely away from the rim.

The present invention is also directed to preventing dirt and foreign materials from accumulating around air valves. This problem is solved by using a plug which fits in the side wall of a tire and covers the end of the valve and the air conduit.

Further, the present invention is directed to locating an air conduit on a tire at a position that is accessible for filling and pressure measurement, that is protected from damage from passing objects, and which is subject to minimum flexure of the tire during operation. These objectives are achieved by locating the end of the air conduit in the air chamber substantially at the center of the track wall, running the air conduit laterally across the track wall and positioning the air valve in the side wall of the tire.

Other aspects, objects and advantages of this invention can be obtained from a study of the drawings, and disclosure, and the appended claims.

BRIEF DESCRIPTION OF THE DRAWINGS

FIG. 1 is an enlarged fragmentary cross sectional view of a tire in accordance with an embodiment of the present invention.

FIG. 2 is an enlarged fragmentary cross sectional view of an alternative embodiment of the present invention.

FIG. 3 is an enlarged fragmentary cross sectional view of another embodiment of the present invention.

BEST MODE FOR CARRYING OUT THE INVENTION

FIG. 1 illustrates a tire carcass 7 having two side walls 8 (only one shown), a rim wall (not shown) and a track wall 10 which forms a closed air chamber 12. The carcass is helically wound with a radial wire wrap 14 to provide strength and protection for the tire. The exterior surface of the track wall 10 contains a plurality of circumferential grooves 17 which receive a track belt 18. The track belt provides the wearing surface of the tire and includes a circumferential wrap 19 containing a plurality of circumferentially wound, inextensible steel cables to retain the anchor plates 20 and the steel shoes 21 that are bolted to the anchor plates 20. U.S. Pat. No. 3,899,220 cited above further describes the construction and operation of these track belts 18 that have metal shoes.

The tire carcass 7, FIG. 1 contains within its track wall 10 a resilient air conduit 26 that is fabricated from a material designed to flex with the tire. The air conduit enters the air chamber 12 in the generally static central area of the track wall. This is near or at the center line of the track wall where there is less flexure of the rubber and the radial wire wrap 14. The air conduit runs through a passage 28 and is sealed in the passage at the entrance to the air chamber 12 by a bonding compound so that air can not escape from the tire. The passage 28 extends from the exterior surface of the track wall 10 through to the air chamber 12 and passes between the strands of the radial wrap 14.

The air conduit 26, FIG. 1, lays in a lateral groove or trough 25 that extends across the track wall 10 and to a depth below the circumferential grooves 17. In this embodiment the trough is located in a non-wearing portion of the tire because of the track belt 18. The trough 25 can be positioned in a similar location as illustrated in FIG. 3.

As seen in FIG. 1, the air valve receptacle 27 is located in the relatively thick rubber portion of the tire. This area is at the juncture of the track wall 10 and the side wall 8. The receptacle 27 is flanged to prevent separation from the tire and is threaded internally to receive a conventional air valve (not shown). The air valve is protected from foreign materials by a rubber plug 29 that is removable from the side wall of the tire and is contoured to the profile of the tire. The plug encapsulates a metal cap 30 which protects the air valve receptacle 27. When the plug and metal cap are removed, the air valve is accessible for filling and pressure measurement.

The air conduit 26, FIG. 1, can be installed on tires that have already been vulcanized. The lateral trough or slot 25 is milled across the outside of the track wall 10 to a depth below the circumferential grooves 17 and from the center of the tire to the side wall 8. The passage 28 is drilled in the bottom of the trough which passes between the strands of the radial wrap 14 and which communicates with the air chamber 12. Thereafter, the air conduit tube 26 is inserted in the passage 28 and is sealed in place with a bonding compound. The air conduit is placed in the trough so that it resides below the bottom of the grooves 17 and the air valve receptacle 27 is sealed with the plug 29. Depending on the application, the conduit may or may not be bonded in the trough. Lastly, the track belt 18 is mounted on the carcass and covers the air conduit.

It should be appreciated from FIG. 1 that the shoes 21 and anchor plates 20 extend out and beyond the side wall 8 and protect the plug 29 and the air valve receptacle 27 from damage.

FIG. 2 illustrates an alternative embodiment of the present invention wherein an air conduit tube 33 is bonded inside of a tire carcass 7 during fabrication. The tube is resilient so that it flexes with the tire and is positioned to communicate with the air chamber 12 through the nearly static central area of the track wall 10 near the center line of the carcass. The tube 33 terminates in a flanged air valve receptacle 27 of conventional construction. The receptacle receives a conventional threaded air valve (not shown) and is protected from foreign materials by a plug 29 which is recieved in a recess in the side wall 8 of the tire.

The embodiment of FIG. 2 utilizes an air conduit tube 33 that is molded in place during production of the tire. The tire is fabricated in the conventional manner and prior to vulcanizing the tube 33 is inserted into the layers of uncured elastomer. After vulcanization, the tube is captured within the tire carcass.

FIG. 3 illustrates another embodiment of the present invention wherein an air conduit 37 is located in a tire 7 having a tread belt 39 integrally formed within the tire carcass 7. The tread belt comprises a track wall 10, a radial wire wrap 14, a layer of fabric 41, a circumferentially wound filament 40, and a grooved tread 44. The layers are applied to form the crown of the tire and to insulate the loops of radial wire wrap 14 from the loops of the filament 40. The loops of filament are circumferentially inextensible and the filament is composed of either wire, cable, or a glass fiber. The circumferential tread belt 39 is surmounted by a grooved tread 44 of conventional construction.

In FIG. 3, the air conduit 37 is a hollow passage in the tire carcass. This conduit does not utilize a resilient tube like the embodiments described above. The hollow passage 37 is located in the tire carcass in generally the same location as illustrated in FIGS. 1 and 2. The hollow passage 37 communicates with the air chamber 12 at or near the center line of the track wall 10 and terminates in a flanged air valve receptacle 27. The receptacle 27 is accessible at the side wall 8 of the tire and the recess providing access to the air valve receptacle is covered by a plug 29 and cap 30 as described above. The use of the hollow passage 37 can avoid the possible problem of tube 26, 33 deteriorating in the carcass and the problem of selecting a tube material having exactly the same resilience as the carcass.

The hollow passage 37, FIG. 3 is fabricated after vulcanization by drilling two passages in the tire carcass 7, one perpendicular to the other, and blocking the portion of the passage in the tread 44 with a plug 45. The hollow passage 37 can also be fabricated in the tire carcass 7 using a removable core (not shown). The core is positioned between the layers of uncured elastomer along with the air valve receptacle 27 prior to vulcanization. The tire is fabricated in the conventional manner. After the carcass has been vulcanized, the core is removed leaving only the flanged air valve receptacle 27.

Industrial Applicability

The embodiment of FIG. 1 is installed as described above on tire carcasses after vulcanization. The embodiments of FIGS. 2 and 3 are incorporated into tire carcasses during fabrication as described above. In all embodiments after the air conduit is in place, an air valve (not shown) is threaded into each receptacle 27. The tires are then filled with air and pressure measurements are taken in the conventional manner.

It should be understood that the present invention contemplates use on both open torus and closed torus tires.

Moreover, any of the three air conduit embodiments 26, 33, 37 can be used on tires having either integral belts (FIG. 3) or removable track belts (FIGS. 1 and 2). For example, the tread 44, FIG. 3 can be milled to form a lateral grooves 25, as shown in FIG. 1 and an air conduit 26 can be installed after vulcanization. The tire of FIG. 3 can also be fabricated with the air conduit tube 33 integrally bonded in the carcass.

From the foregoing, it can be seen that damage to the air valve and rupture of the air conduit by the rim is avoided by relocating the air conduit and the air valve receptacle.

Other aspects, objects and advantages of this invention can be obtained from a study of the drawings, the disclosure and the appended claims.

I claim:

1. In a tire (7) having an interior air chamber (12) bounded in part by a side wall (8) and a track wall (10), the improvement comprising:
   an elongated air conduit (26, 33, 37) having first and second ends, said first end communicates with said air chamber (12) through said track wall (10) and said second end being disposed in said side wall (8); and
   an air valve receptacle (27) in said side wall (8) and at said second end of said air conduit (26, 33, 37).

2. A tire as in claim 1 wherein said first end of said air conduit (26, 33, 37) communicates with said air chamber (12) at substantially the center of said track wall (10) and wherein said air valve receptacle (27) is accessible for tire filling through said side wall (8).

3. A tire as in claim 1 including a lateral groove (25) in the exterior surface of said track wall (10) and wherein said air conduit (26) includes a resilient tube (26) positioned in said groove (25).

4. A tire as in claim 1 wherein said air conduit (37) is a hollow passage (37) in said tire (7).

5. A tire as in claim 1 wherein said air conduit (33) is a resilient tube (33) positioned within said carcass (7) and bonded thereto.

* * * * *